United States Patent
Fong et al.

(10) Patent No.: US 7,421,656 B2
(45) Date of Patent: Sep. 2, 2008

(54) SYSTEMS AND METHODS FOR INTERACTING WITH A USER INTERFACE OF A MEDIA PLAYER

(75) Inventors: Jeffrey Fong, Seattle, WA (US); David Franklin, Seattle, WA (US); Thamer Abanami, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 582 days.

(21) Appl. No.: 10/751,846

(22) Filed: Jan. 5, 2004

(65) Prior Publication Data

US 2005/0146534 A1   Jul. 7, 2005

(51) Int. Cl.
*G06F 3/00* (2006.01)
(52) U.S. Cl. .................. 715/716; 715/720; 715/974
(58) Field of Classification Search ............... 715/720, 715/727, 716, 786, 974; 386/6
See application file for complete search history.

(56) References Cited

U.S. PATENT DOCUMENTS

| | | | | | |
|---|---|---|---|---|---|
| 4,165,522 | A | * | 8/1979 | Moller | 360/73.01 |
| 5,864,868 | A | * | 1/1999 | Contois | 707/104.1 |
| 5,903,264 | A | * | 5/1999 | Moeller et al. | 715/719 |
| 6,731,312 | B2 | * | 5/2004 | Robbin | 715/792 |
| 6,909,837 | B1 | * | 6/2005 | Unger | 386/68 |
| D517,088 | S | * | 3/2006 | Chong et al. | D14/496 |
| 7,046,230 | B2 | * | 5/2006 | Zadesky et al. | 345/156 |
| 7,116,891 | B2 | * | 10/2006 | Borden, IV | 386/68 |
| 2002/0197593 | A1 | * | 12/2002 | Sutton | 434/276 |
| 2003/0152363 | A1 | * | 8/2003 | Jeannin et al. | 386/68 |
| 2003/0192060 | A1 | * | 10/2003 | Levy | 725/133 |
| 2003/0228131 | A1 | * | 12/2003 | Miyazawa | 386/46 |
| 2003/0236582 | A1 | * | 12/2003 | Zamir et al. | 700/94 |
| 2004/0047614 | A1 | * | 3/2004 | Green | 386/111 |
| 2004/0225519 | A1 | * | 11/2004 | Martin | 705/1 |
| 2004/0242269 | A1 | * | 12/2004 | Fadell | 455/556.2 |
| 2005/0031296 | A1 | * | 2/2005 | Grosvenor | 386/4 |
| 2006/0007115 | A1 | * | 1/2006 | Furuhashi et al. | 345/156 |
| 2006/0046778 | A1 | * | 3/2006 | Hembree | 455/557 |
| 2006/0095848 | A1 | * | 5/2006 | Naik | 715/716 |
| 2006/0123977 | A1 | * | 6/2006 | Chiang | 84/600 |
| 2006/0209641 | A1 | * | 9/2006 | Navid | 369/30.06 |

(Continued)

OTHER PUBLICATIONS

Thomson Consumer Electronics, RCA User's Guide LYRA RD2201/2202/2204, 1999, pp. 19,22 and 23.*

(Continued)

*Primary Examiner*—Tadesse Hailu
*Assistant Examiner*—Nicholas S Ulrich
(74) *Attorney, Agent, or Firm*—Woodcock Washburn LLP

(57) ABSTRACT

Systems and methods for interfacing with playback of media by a media player are provided. By combining the functionality of fast forward and skip forward into a single button control, the invention reduces the numbers of control buttons that need be included on a device, reducing device costs and consumer "button overload." In one embodiment, by pressing (and releasing) a forward button, media being rendered by a media player skips to a predetermined location in the media. By pressing and holding (and then releasing) the forward button, the media being rendered is fast forwarded according to algorithms for fast forwarding. A backward button covers skipping backward and fast reversing in a similar fashion. A device including a play/pause button and the described forward and backward buttons advantageously reduces the number of buttons required by two buttons.

23 Claims, 8 Drawing Sheets

U.S. PATENT DOCUMENTS

2006/0218505 A1* 9/2006 Compton et al. ............ 715/781
2006/0232554 A1* 10/2006 Wong et al. ................. 345/157

OTHER PUBLICATIONS

Doug Adams, Doug's Applescripts for iTunes Changes in iTunes 2.0.3, Dec. 15, 2001, http://www.dougscripts.com/itunes/itinfo/203changes.php, p. 1.*

Apple iTunes 2.0.3—VersionTracker, http://www.versiontracker.com/dyn/moreinfo/macos/9688&vid=33561, Oct. 27, 2006, pp. 1 and 2.*

Andrew S. Tanenbaum, Structured Computer Organization,1984, Prentic Hall Inc, Second Edition, pp. 10-12.*

ReplayTV 4000 User Guide, 2001, SONICblue Incorporated, 49-52.*

Antoniac, P. et al., "Wireless user perspectives in Europe: HandSmart mediaphone interface," *Wireless Personal Commun.*, 2002, 22(2), 161-174.

Braun, N., "Symbolic conversation modeling used as abstract part of the user interface," *J. of WSGC*, 2002, 10(2), 333-340.

Clark, D.I. et al., "Application level user interfaces for various media," *Proceedings Technology of Object-Oriented Languages and Systems. Tools 32*, Nov. 22-25, 1999, Melbourne, Australia, 16-27.

Dieberger, A. et al., Exploratory navigation in large multimedia documents using Context Lenses, *Proceedings of the 35th Annual Hawaii Int'l Conference on System Sciences*, Jan. 7-10, 2002, Big Island, Hawaii, 911-917.

Emiliani, P.L., "User interfaces for disabled and elderly people: a European perspective," *Symbiosis of Human and Artifact. Proceedings of the Sixth Int'l Conf. on Human-Computer Interactions*, Jul. 9-14, 1995, Tokyo, Japan, vol. 1, 131-136.

Hanada, K. et al., "User interface of multi media database," *Sharp Tech. J.*, 1989, 43, 67-72 (English language abstract included).

Petrie, H. et al., "Universal interfaces to multimedia documents," *Proceedings Fourth IEEE Int'l Conf. on Multimodal Interfaces*, Oct. 14-16, 2002, Pittsburgh, PA, 319-324.

Roth, V., "Content-based retrieval from digital video," *Image and Vision Computing*, 1999, 17(7), 531-540.

"Compaq IPAQ PCD-1 Personal CD Player User Guide", Internet Citation, Dec. 1, 2001, http://h10032.www1.hp.com, 23 pages, XP-002425215.

"Neue MP3-CD-Player von Compaq", Internet Citation, Oct. 23, 2001, http://www.heise.de/newsticker, XP-002425216, 1 page.

iHP-100 User Manuel, Internet Citation, Aug. 13, 2003, http://web.archive.org/web, XP-002425217, 25 pages.

"iRiver America-iHP-100", Internet Citation, Aug. 14, 2003, http://web.archive.org/web, XP-002425218, 1 page.

"Neue Versionen von iPod & Co"., Internet Citation, Sep. 8, 2003, http://www.heise.de/newsticker/result, XP-002425219, 1 page.

"iPAQ Personal CD Player PCD-1", Ineternet Citation, Mar. 16, 2007, http://web.archive.org/web, XP-002425220, 1 page.

iHP-100 Support, Internet Citation, Aug. 13, 2003, http://web.archive.org/web, XP-002425221, 1 page.

* cited by examiner

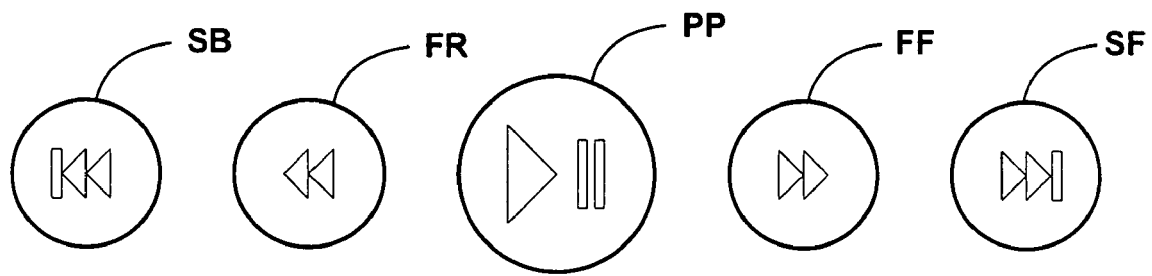
FIG. 1 – Prior Art

SYSTEMS AND METHODS FOR INTERACTING WITH A USER INTERFACE OF A MEDIA PLAYER

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2003, Microsoft Corp.

FIELD OF THE INVENTION

This invention relates to an improved user interface for interacting with a media player. More particularly, this invention relates to a user interface that combines the functionality of multiple buttons to provide fewer buttons, e.g., for smaller form factor devices.

BACKGROUND

With the advent of portable digital media players of small form factor, there is a challenge in limiting the hardware button set to a useful and usable set. Typically, media players solve this problem by eliminating all but "the important" controls and providing a subset of the controls found on larger audio/video (A/V) equipment consoles and digital media center remotes. For digital video and television (TV) scenarios, individual buttons have been separately, but collectively, provided for each of the following functions: Jump "n seconds" forward (or skip forward), Jump "n seconds" backward (or skip backward), Scan forward and Scan backward.

For illustrative purposes, an exemplary prior art media playback user interface is shown in FIG. 1. A play/pause button PP toggles between rendering a designated selection of media and pausing the rendering of the selection. When the selection of media is being rendered, pressing the fast forward button FF causes the media to be rendered faster, allowing a user to move through the selection at a faster pace while still observing some characteristics of the selection to know when to stop fast forwarding the selection. Typically, pressing the fast forward button FF again causes the movie to return to the play speed, or causes the fast forward process to toggle through different speeds. Selecting the play/pause button PP also generally returns the rendering of the media to play speed. Similar to the fast forward button FF, there is a fast rewind, or fast reverse, button FR, except that the media is rendered backward instead of forward.

The prior art user interface also includes a skip forward button SF and a skip backward button SB. The skip forward button SF either causes the next media selection in a set to be played or causes the rendering of the media to skip forward a predetermined distance, which may either be to a predetermined location (like the next chapter in a DVD rendering process) or may be to a predetermined time ahead (like 120 seconds ahead of a present location). The skip backward button SB works similarly, but once again, operates to cause the rendering of the media to skip backward a predetermined amount, as predetermined by location or time.

However, as noted, for smaller form factors, such as MP3 players, portable movie players and the like, there is a need to reduce the associated hardware set of buttons to a more efficient set in view of hardware real estate restrictions. Additionally, a small device with a multitude of buttons is intimidating from a user standpoint, regardless of real estate restrictions. Even if not intimidating, it would be desirable to reduce the cost of a device by providing a more efficient set of user interface controls. Accordingly, it would be desirable to provide an improved user interface for rendering media that addresses the problems presented by the state of the art.

SUMMARY OF THE INVENTION

In consideration of the shortcomings of the art, the present invention provides systems and methods for interfacing with a user interface of a media player. By combining the functionality of Fast Forward and Skip Forward into a single button control, the invention reduces the numbers of hardware control buttons that need be included on a device, reducing device costs and consumer "button overload." In one embodiment, by pressing (and releasing) a forward button, media being rendered by a media player skips to a predetermined location in the media. By pressing and holding (and then releasing) the forward button, the media being rendered is fast forwarded according to algorithms for fast forwarding. A backward button covers skipping backward and fast reversing in a similar fashion. In one embodiment, the skip forward function of the forward button skips forward in the rendering of the media by a predetermined amount of time. In this regard, a device including a play/pause button and forward and backward buttons in accordance with the invention advantageously reduces the number of buttons required of the design of the device by two buttons.

Other advantages and features of the invention are described below.

BRIEF DESCRIPTION OF THE DRAWINGS

The systems and methods for providing an improved media rendering user interface in accordance with the present invention are further described with reference to the accompanying drawings in which:

FIG. 1 illustrates a prior art design of a media rendering user interface that requires five buttons to achieve skip backward, fast reverse, play/pause, fast forward and skip forward;

DETAILED DESCRIPTION OF THE INVENTION

Overview

As mentioned, where the prior art provides separate buttons for each of skip backward, fast rewind, play/pause, fast forward, and skip forward, the invention provides systems and methods for interfacing with the playback of media with three controls: backward, play/pause and forward. The backward and forward buttons, skip or accelerate a playback rate depending on whether the button is clicked or pressed and held, respectively. Other features of the invention are described below.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for interfacing with media being rendered in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. Media storage, retrieval and rendering are particularly relevant to those computing devices operating in a network or distributed computing environment, as sources for disparate types of media exist in many different places in a computing environment that is interconnected via a plurality of networks and thus the methods for interfacing with media rendering processes in accordance with the present invention can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may be implicated by the methods for navigating the playing of media in accordance with the invention.

Figure 2A:
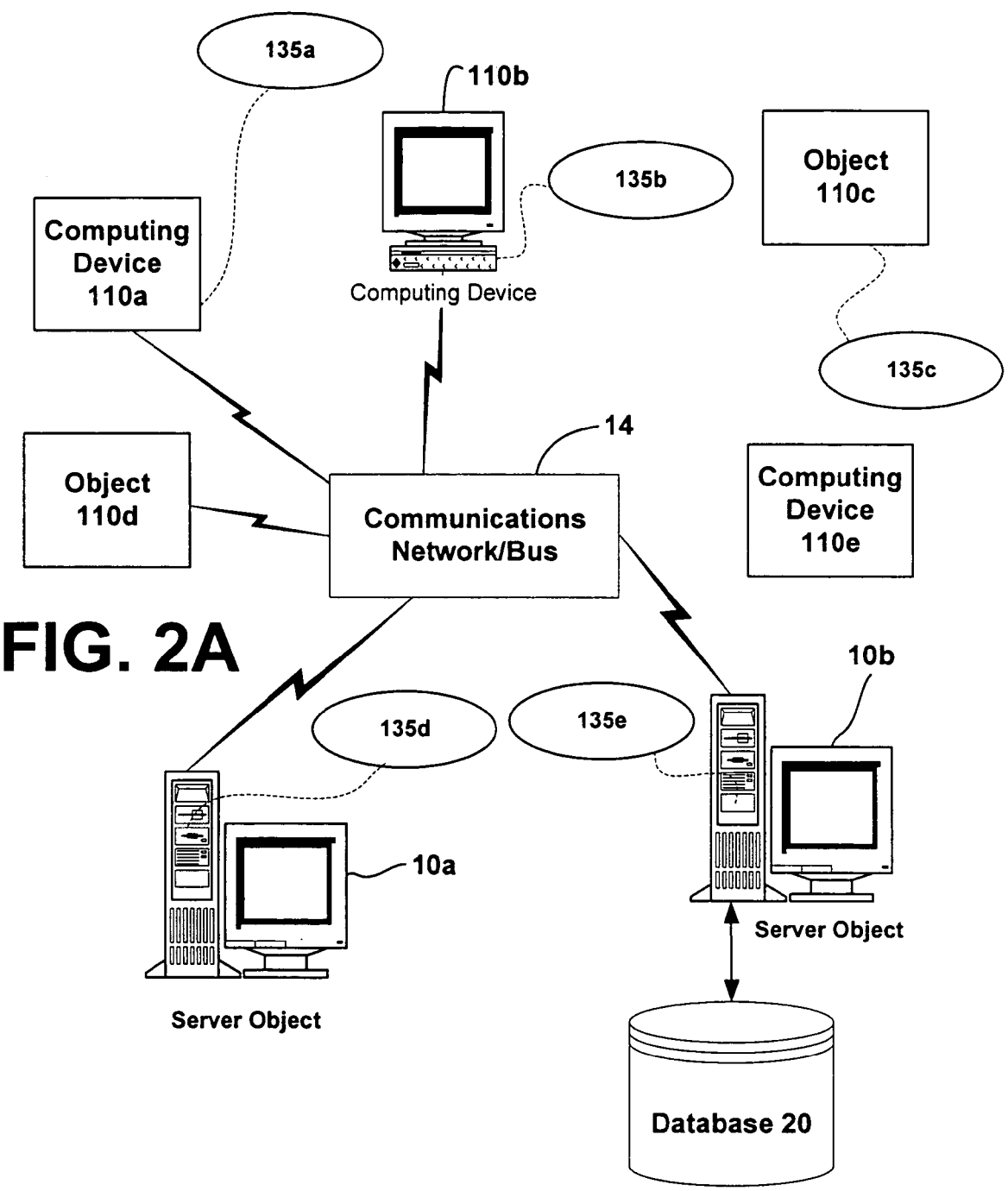
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players and other media rendering devices, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, in connection with a user interface provided in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, personal or portable media players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to navigating media according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11x) or wired (e.g., Home PNA, Cat 5, Ethernet, even power line) connectivity. Voice traffic may enter the home either as wired (e.g., Cat 3) or wireless (e.g., cell phones) and may be distributed within the home using the associated wiring. Entertainment media, or other graphical data, may enter the home either through satellite or cable and is typically distributed in the home using coaxial cable. IEEE 1394 and DVI are also digital interconnects for clusters of media devices. All of these network environments and others that have emerged or may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which implicate the user interface experience enabled by the present invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over the network(s). Because of such widespread information sharing, remote networks such as the Internet have thus far generally evolved into an open system for which developers can design software applications for performing specialized operations or services, essentially without restriction.

A network infrastructure enables a host of network topologies such as client/server, peer-to-peer, or hybrid architectures. In client/server architectures, for instance, the "client" is a member of a class or group that uses the services of another class or group. Thus, in computing, a client is a process, i.e., roughly a set of instructions or tasks, that requests a service provided by another program. Typically, the client process utilizes the requested service without having to "know" any working details about the other program or the service itself. In a client/server architecture, particularly a networked system, a client is usually a computer that accesses shared network resources provided by another computer, e.g., a server. In the example of FIG. 2A, for example, computers 110a, 110b, etc. could be thought of as clients and computers 10a, 10b, etc. could be thought of as servers where servers 10a, 10b, etc. maintain data that is transmitted to the client computers 110a, 110b, etc. upon request, although any computer can be considered a client, a server, or both, depending on the circumstances. Any of these computing devices may be processing data or requesting services or tasks that may implicate the user interface of the invention.

A server is typically a remote computer system accessible over a remote or local network, such as the Internet. The client process may be active in a first computer system, and the server process may be active in a second computer system, communicating over a communications medium, thus providing distributed functionality and allowing multiple clients to take advantage of the information-gathering capabilities of the server. Any software or media objects utilized pursuant to the user interface of the invention may be distributed across multiple computing devices or objects. For instance, in a thin client computer, the user interface of the invention could be provided via a remoting protocol, such as the remote desktop protocol (RDP).

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address, such as an IP address or other reference such as a Universal Resource Locator (URL), can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to implement an improved experience for media interaction.

In a network environment in which the communications network/bus 14 is the Internet, for example, the servers 10a, 10b, etc. could be Web servers with which the clients 110a, 110b, 110c, 110d, 110e, etc. communicate via any of a number of known protocols, such as HTTP. Servers 10a, 10b, etc. may also serve as clients 110a, 110b, 110c, 110d, 110e, etc., as may be characteristic of any distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2B:
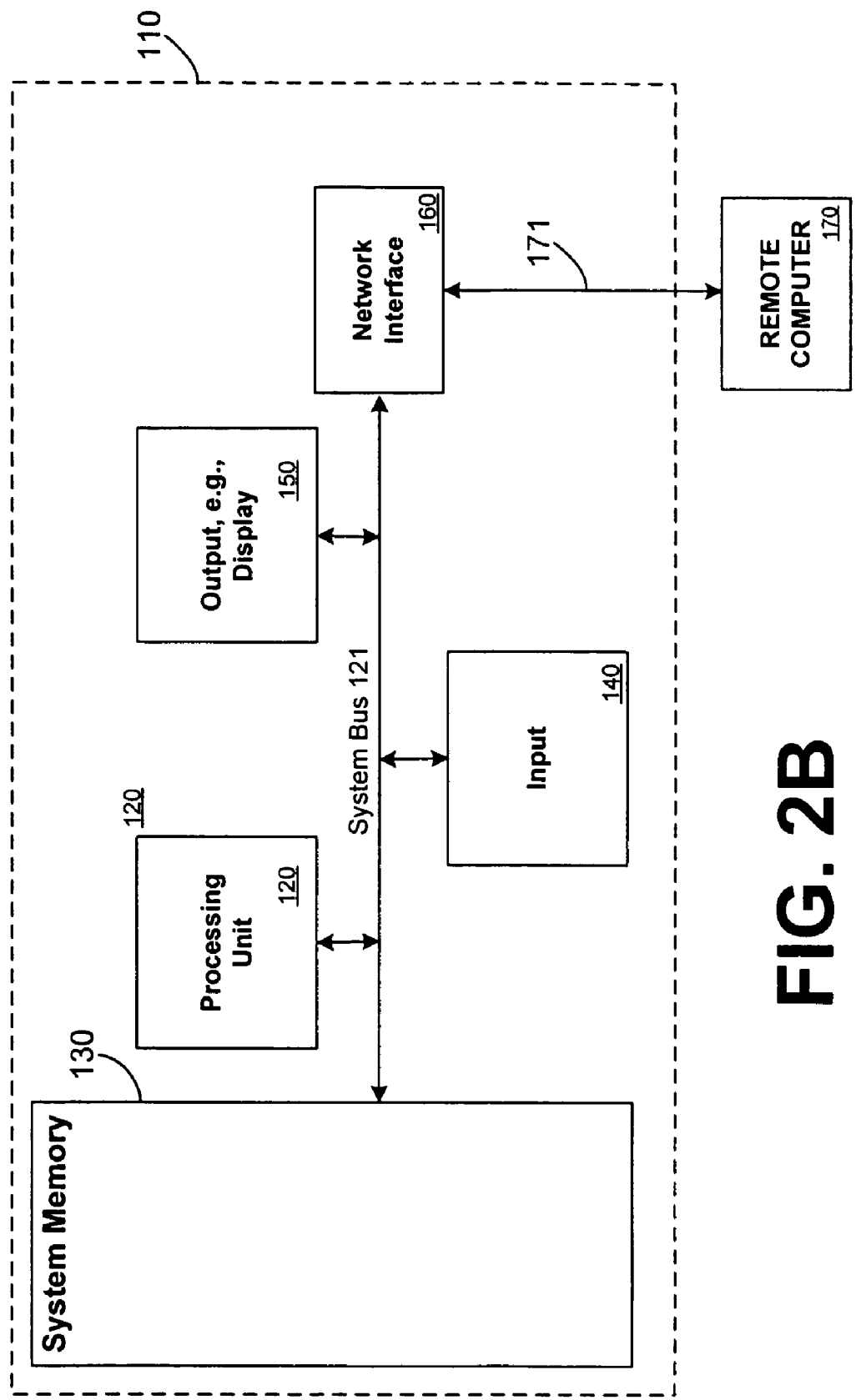
FIG. 2B is a block diagram representing an exemplary non-limiting computing device in which the present invention may be implemented.

FIG. 2B and the following discussion are intended to provide a brief general description of a suitable computing environment for a media device in connection with which the techniques of the invention can be applied with great efficacy. It should be understood, however, that handheld, portable and other computing devices and computing objects of all kinds are contemplated for use in connection with the present invention, i.e., anywhere that a device may wish to provide a rich media navigation experience for playing media. The invention may also be used for non media playing applications wherein it is desirable to control the progress of an ongoing process, by using the forward and backward buttons of the invention. The general purpose computer described below is but one example, and the present invention may be implemented with any client with or without network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or in a standalone device, such as a portable media player. In essence, anywhere that data may be stored or from which data may be retrieved or transmitted to another computer is a desirable, or suitable, environment for operation of the rich media navigation experience provided by the invention.

Although not required, the invention can partly be implemented via an operating system, for use by a developer of services for a device or object, and/or included within application software that operates in connection with the user interface component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 2B thus illustrates an example of a suitable computing system environment 100a in which the invention may be implemented, although as made clear above, the computing system environment 100a is only one example of a suitable computing environment for a device and is not intended to suggest any limitation as to the scope of use or functionality of the invention. Neither should the computing environment 100 be interpreted as having any dependency or requirement relating to any one or combination of components illustrated in the exemplary operating environment 100a. Moreover, while exemplary embodiments are described herein with respect to the navigation of media, such as songs, or movies, the invention is not so limited. Any navigation experience may benefit from the user interface controls of the invention.

With reference to FIG. 2B, an exemplary device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110, such as during start-up or initiation of an application or user interface, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121 by an interface, such as a removable memory interface.

A user may enter commands and information into the computer 110a through input devices such as a keyboard and pointing device, commonly referred to as a mouse, trackball, touch pad, pen or stylus, etc. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities similar to, but different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 2C include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods for interacting with a media rendering experience in accordance with the invention may be included in, supported in or accessed via all of the languages and services enabled by managed code, such as .NET code, and in other distributed computing frameworks as well.

Figure 3:
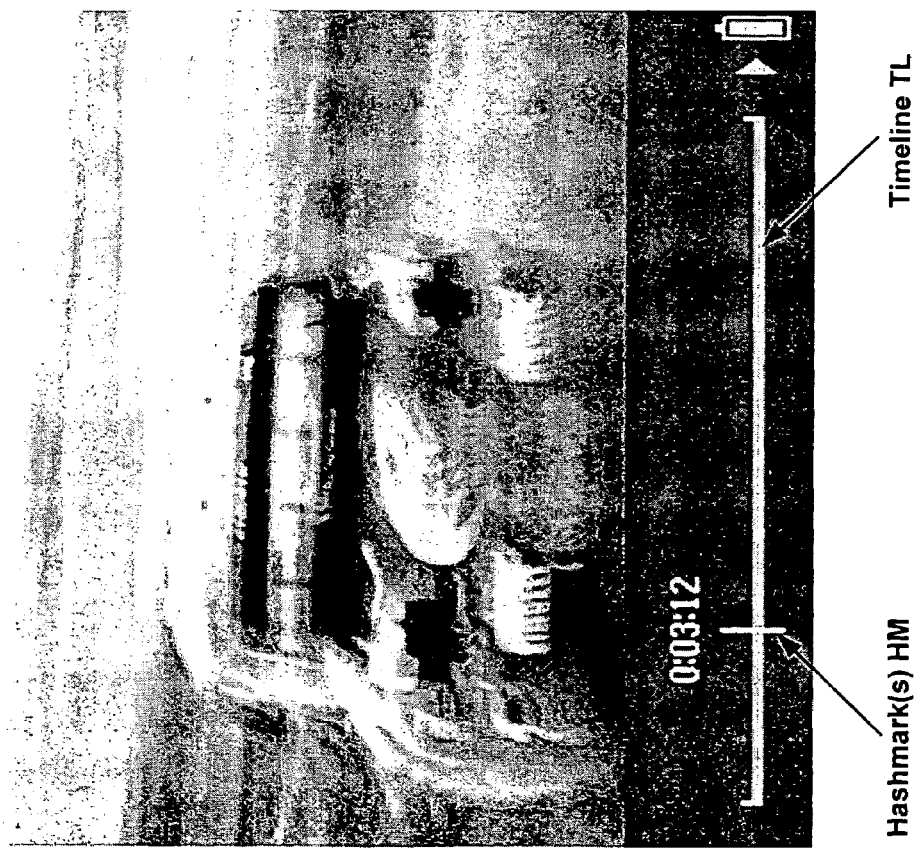
FIG. 3 illustrates an exemplary optional timeline that may be utilized in conjunction with the present invention.

Systems and Methods for Providing an Improved User Interface for Media Rendering As mentioned, in recognition of the need for a stream-lined user interface for portable media players, the invention provides user interface objects that enable an efficient set of user interface controls. For instance, in accordance with exemplary implementation of the user interface controls of the invention, a designer of a portable media device may decide that when video is playing, each press on a forward button skips forward 29 seconds in the video and as the forward button continues to be held, the video playback rate increases from 2 to 120 times faster than the normal rate of rendering the video. Pre-identified key frames can be displayed for distinctness during the fast forward or skip process. Moreover, as illustrated in FIG. 3, a timeline TL representing the relative current position being rendered (and other positions) in the video may optionally be displayed via hashmark(s) HM. In one embodiment, during fast forwarding or skipping with the forward button, if key frames are not available, the frame at the time of pressing the button is displayed, the sound is not output, and a timeline is displayed to represent the forward progress being made in the media being rendered. An exemplary implementation of a timeline control is illustrated in FIG. 3.

Similarly, when implementing the controls of the invention, a designer of a portable media device may decide that, when video is playing, each press on a backward button skips backward 7 seconds in the video and as the backward button continues to be held, the video playback rate plays back in reverse from 2 to 120 times faster than the normal rate of rendering the video backwards. Pre-identified key frames can be displayed for distinctness during the fast forward or skip process.

In one implementation of the forward and backward buttons of the invention, when video is paused, either the behavior of the above-described "media being rendered" scenario applies, or alternatively, to facilitate navigation of video segments, including the beginning and end of the video file, e.g., recorded digital TV, a single press of the forward (or backward) button results in the illustration of position information on a timeline via hashmarks or the like, e.g., showing 15 minute intervals and moving to the next or previous hashmark based on the forward and backward button being pressed, respectively.

The hardware buttons and controls on a portable media device that may use the invention may fit into categories. For instance, the categories Power (ON/OFF), Lock (LOCK), Playback (REV, PLAY, FF, and VOLUME), Navigation UP, DOWN, LEFT, RIGHT, OK, BACK and START) and Optional Presets (Optional Presents 1, 2, 3 and 4).

Figure 4:
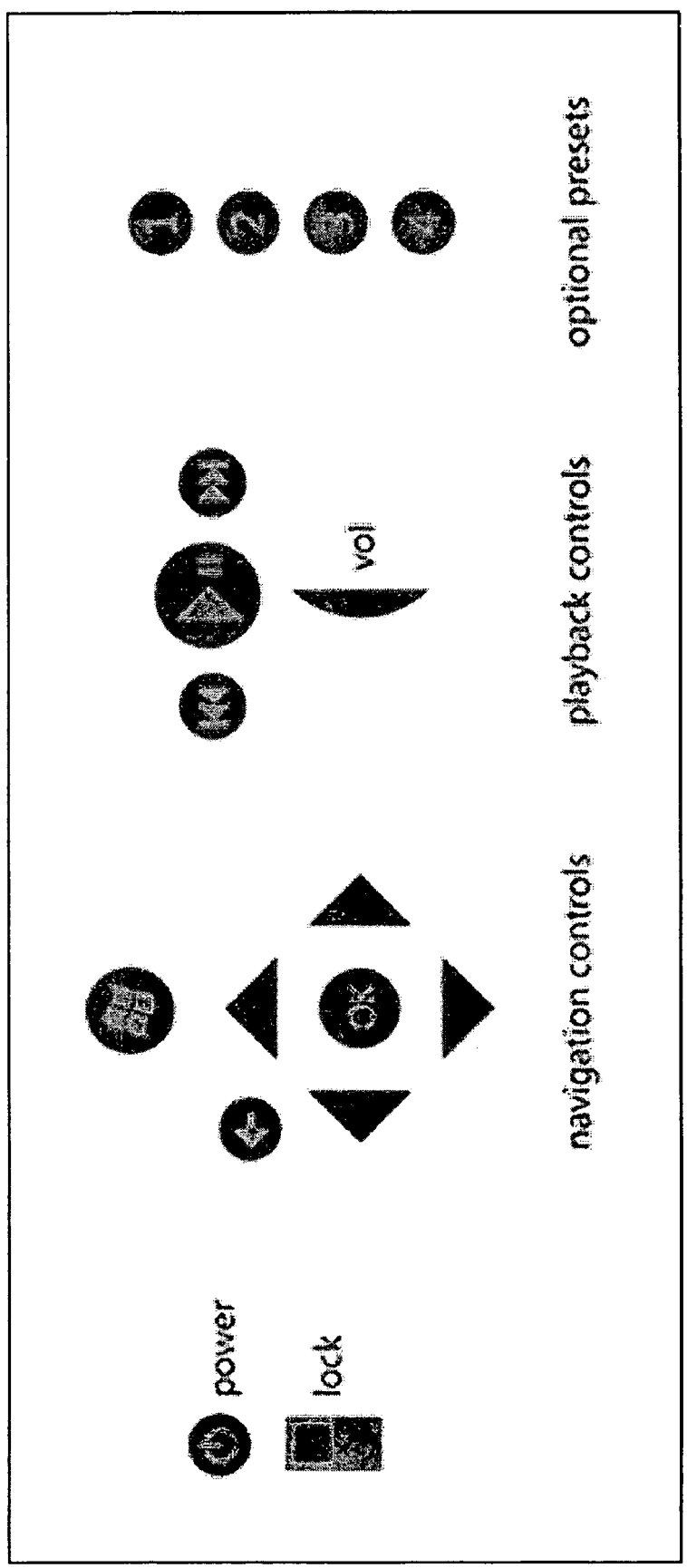
FIG. 4 illustrates an exemplary set of button controls including the playback controls of the invention.

Exemplary descriptions of the function(s) of each button shown in FIG. 4 for a non-limiting embodiment of the invention are as follows:

ON/OFF: to turn the device on and off.

LOCK: when the lock is engaged, all other controls are disabled. The device can be locked when it is on (e.g., while playing music) or when it is off. In one embodiment, when the device is locked, there is no indication in the UI that the device is locked.

REV (or FF): clicking this button jumps back (or forward) at a coarse level (tracks in music, key frames in video, pictures in a slideshow); press-and-holding this button scans backward (or forward) through the current media item, e.g., with a variable rate or with an accelerating scan.

PLAY: clicking this button toggles between play and paused state when the media is being rendered and PLAY, REV and FF affect playback of what is currently playing (or paused) as described in exemplary embodiments of the invention.

VOLUME: this control, e.g., dial control, allows the user to adjust the audio playback volume for the device. The volume setting applies to all audio output for the device: music, video and UI.

UP (or DOWN): when navigating a list of options, clicking this button selects the previous (or next) item in the list. For audio visualizations, for instance, the UP and DOWN button may move through the set of visualizations.

LEFT (or RIGHT): when navigating a band of screens, clicking this button moves the user left (or right) to the previous (or next) screen in the band.

OK: drills deeper into the selected item and on a leaf item, takes an action appropriate to it. For example, pressing OK on an artist name will take the user to a screen showing all the albums by that artist, pressing OK on one of those albums will take the user to a screen showing all the tracks on that album and pressing OK on one of the tracks begins playing the selected track.

BACK: moves outward to the previous screen or band of screens, e.g., opposite of the OK functionality.

START: moves to a root menu of the Library, i.e., the Start screen; if already at the root menu of the Library, this button moves the user to a "Now Playing" menu.

Optional Presets 1, 2, 3 and 4: clicking a preset button, for instance, may move the user to the "Now Playing" menu and begin playback of the media content associated with that preset button; press-and-holding a preset button may cause the preset button to become associated with the contents of the current screen. For example, if the user press-and-holds 1 on the screen showing all the albums by Beck, the first preset may be associated with all songs by Beck as a result.

Within the Now Playing menu, the playback controls (the REV, PLAY and FF buttons) may be used to control the playback of the currently playing media item. Also, if the user is listening to music while browsing in the library, the playback controls function the same way. If the media is playing, the "playback position" is the place that is currently playing, e.g., "two minutes into the third song in the playlist." If the media is paused, the "playback position" is the place that will play when playback resumes.

Remote controls may still have separate skip and scan buttons for both forward and backward.

With respect to controlling music playback, in alternate non-limiting embodiments of the user interface controls of the invention, while music is playing (or is paused), the playback controls of the invention function as follows:

REV button: move backward by track (on click) and scan backward (on press-and-hold). Clicking the REV button moves the playback position to the start of the current track; if the playback position is already within a second of the start of the current track, the playback position is moved to the start of the previous track (in the current album or playlist); if already on the first track, clicking the REV button moves the playback position to the start of the first track. Press-and-holding the REV button results in an accelerating reverse scan of the music, depending upon the capabilities of the device. In one embodiment, the reverse scan continues across track boundaries, but stops at the start of the first song of an album, playlist, or queue. In other embodiments, the user can scan music while the music is paused, but after releasing the REV button, the music remains paused.

FF button: move forward by track (on click) and scan forward (on press-and-hold). Clicking the FF button moves the playback position to the start of the next track (in the current album or playlist); if already on the last track, the playback position is set to be the end of the last track. In various embodiments, press-and-holding the FF button results in an accelerating forward scan of the music. The forward scan continues across track boundaries, but stops at the end of the last song of the album, playlist, or queue that is being played. Also, in one embodiment, the user can scan music while the music is paused and after releasing the FF button, the music is still paused.

PLAY button: clicking the PLAY button toggles the play/pause state; if music is paused, playback resumes; if music is playing, playback is paused.

With respect to controlling TV/Video playback, in alternate non-limiting embodiments of the user interface controls of the invention, while TV or video content is playing (or is paused), the playback controls of the invention function as follows:

REV button: move backward by a fixed increment (on click) and scan backward (on press-and-hold). Clicking the REV button moves the playback position backward by a fixed increment (e.g., 8 seconds—to replay something a user just missed). If this would move the playback position beyond the start of the video, then the playback position is moved to the start of the video. Press-and-holding the REV button results in an accelerating reverse scan of the video. The reverse scan stops at the start of the video. The user can scan while the video is paused and after releasing the REV button, the video remains paused.

FF button: move forward by a fixed increment (on click) and scan forward (on press-and-hold). Clicking the FF button moves the playback position forward by a fixed increment (e.g., 29 seconds—to skip over a commercial). If this would move the playback position beyond the end of the video, then the playback position is moved to the end of the video. In one embodiment, press-and-holding the FF button results in an accelerating forward scan of the video. The forward scan stops at the end of the video. The user can scan while the video is paused and after releasing the FF button, the video remains paused.

PLAY button: clicking the PLAY button toggles the play/pause state; if a video is paused, playback resumes; if a video is playing, playback is paused.

With respect to controlling slideshow playback, in alternate non-limiting embodiments of the user interface controls of the invention, while a slideshow is playing (or is paused), the playback controls of the invention function as follows:

REV button: move back to the previous slide (on click) and continuously move backward one slide at a time (on press-and-hold). Clicking the REV button moves back to the previous slide in the slideshow. If the user is already on the first slide in the slideshow, the user is taken to the last slide in the slideshow (i.e., the slideshow loops backward). Press-and-holding the REV button causes the slideshow to be shown rapidly in reverse, looping through to the end when the start of the slideshow is reached. In one embodiment, each picture is shown for a preset time, e.g., one second.

FF button: move forward to the next slide (on click) and continuously move forward one slide at a time (on press-and-hold). Clicking the FF button moves forward to the next slide in the slideshow. If the user is already on the last slide in the slideshow, the user is taken to the first slide in the slide show. Press-and-holding the FF button causes the slideshow to rapidly advance through the slideshow, looping to the beginning when the end of the slideshow is reached. In one embodiment, each picture is shown for a preset time, e.g., one second.

PLAY button: clicking the PLAY button toggles the play/pause state; if the slideshow is paused, playback resumes; if the slideshow is playing, playback is paused. When a slideshow is paused, pictures are shown, but the slideshow does not automatically advance—the user must manually move through the slides using the FF and REV buttons.

When viewing a slideshow while listening to music, in one embodiment, the playback controls control the music, and the up and down arrows move through the slideshow as described with respect to the FF and REV buttons above.

Figure 5A:
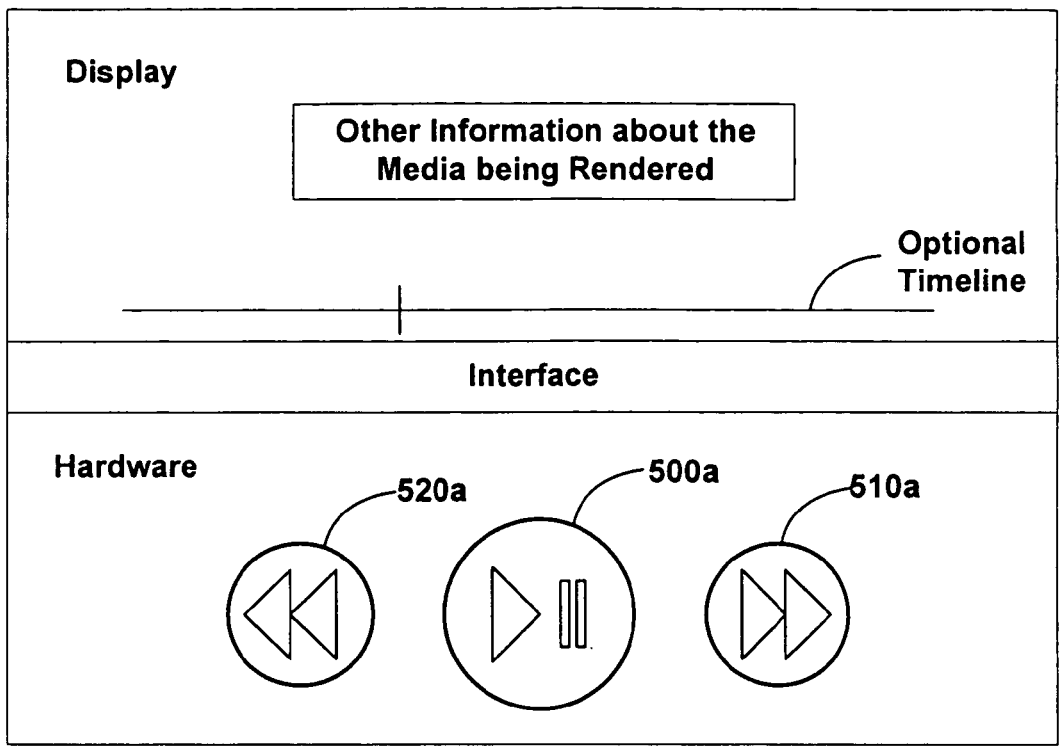
FIGS. 5A and 5B illustrate exemplary computing device operating environments in which the user interface techniques of the invention may be applied.
Figure 5B:
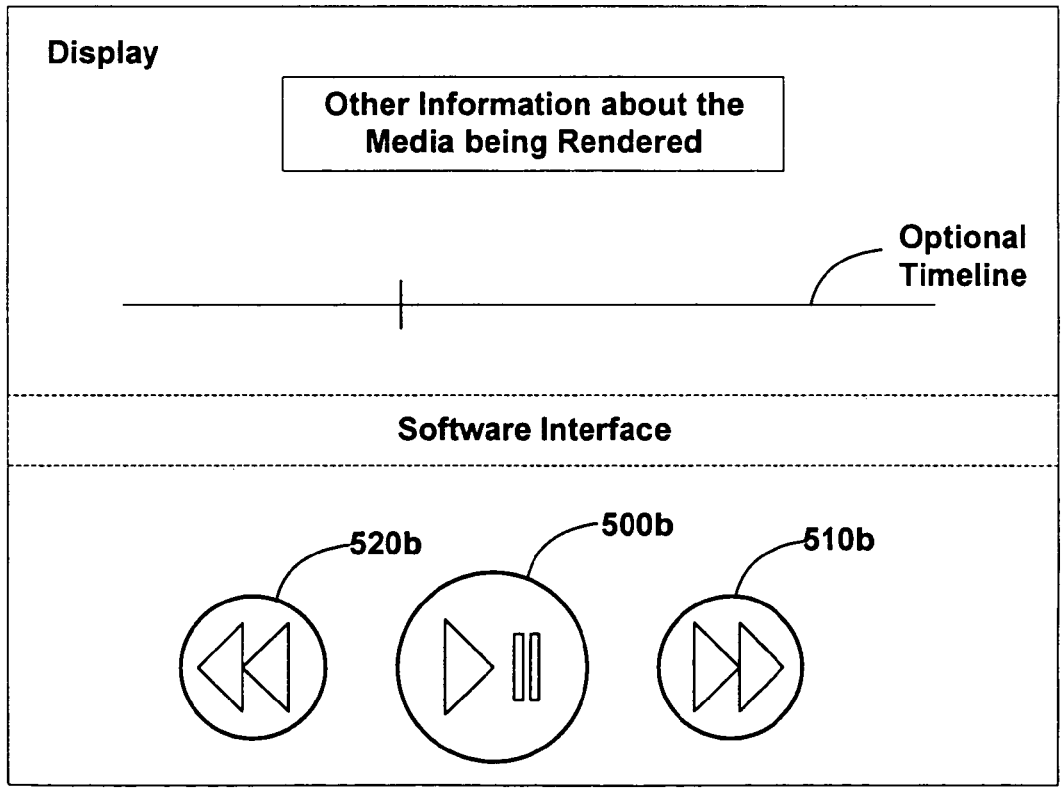

FIGS. 5A and 5B illustrate that the playback controls of the invention, i.e., play/pause button 500, forward button 510 and backward button 520, may be implemented in software or hardware. In FIG. 5A, the hardware buttons 500*a*, 510*a* and 520*b* are hardware buttons, whose operation is handled by a hardware interface. The hardware interface relays the input commands to the user interface control elements, and causes the skipping, fast directional operations to occur and affecting the display as desired as a consequence. In FIG. 5B, the software buttons 500*b*, 510*b* and 520*b* are input via a pointing device, such as a mouse, keyboard or trackball or via touch-screen sensitivity, such as a pen or stylus system. A software interface replaces the need for the hardware interface, and the buttons 500*b*, 510*b* and 520*b* may be displayed on the display itself. In either case, the display supports presentation of various information about the media being played, e.g., the optional timeline described above, the name of the song being played, the artist, etc.

Figure 6A:
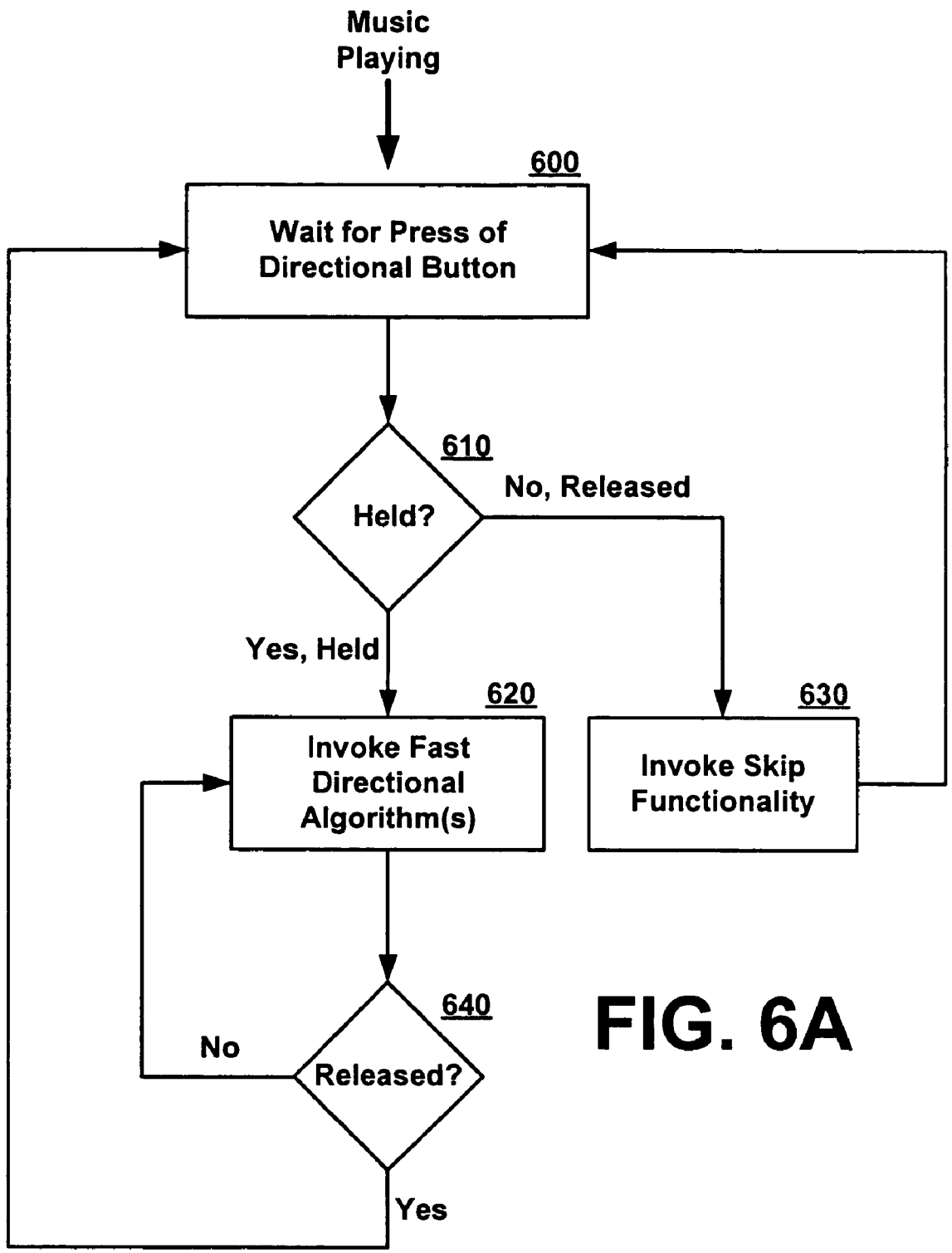
FIGS. 6A and 6B are exemplary non-limiting flow diagrams illustrating exemplary sequencing associated with clicking versus pressing and holding a button in accordance with the invention.
Figure 6B:
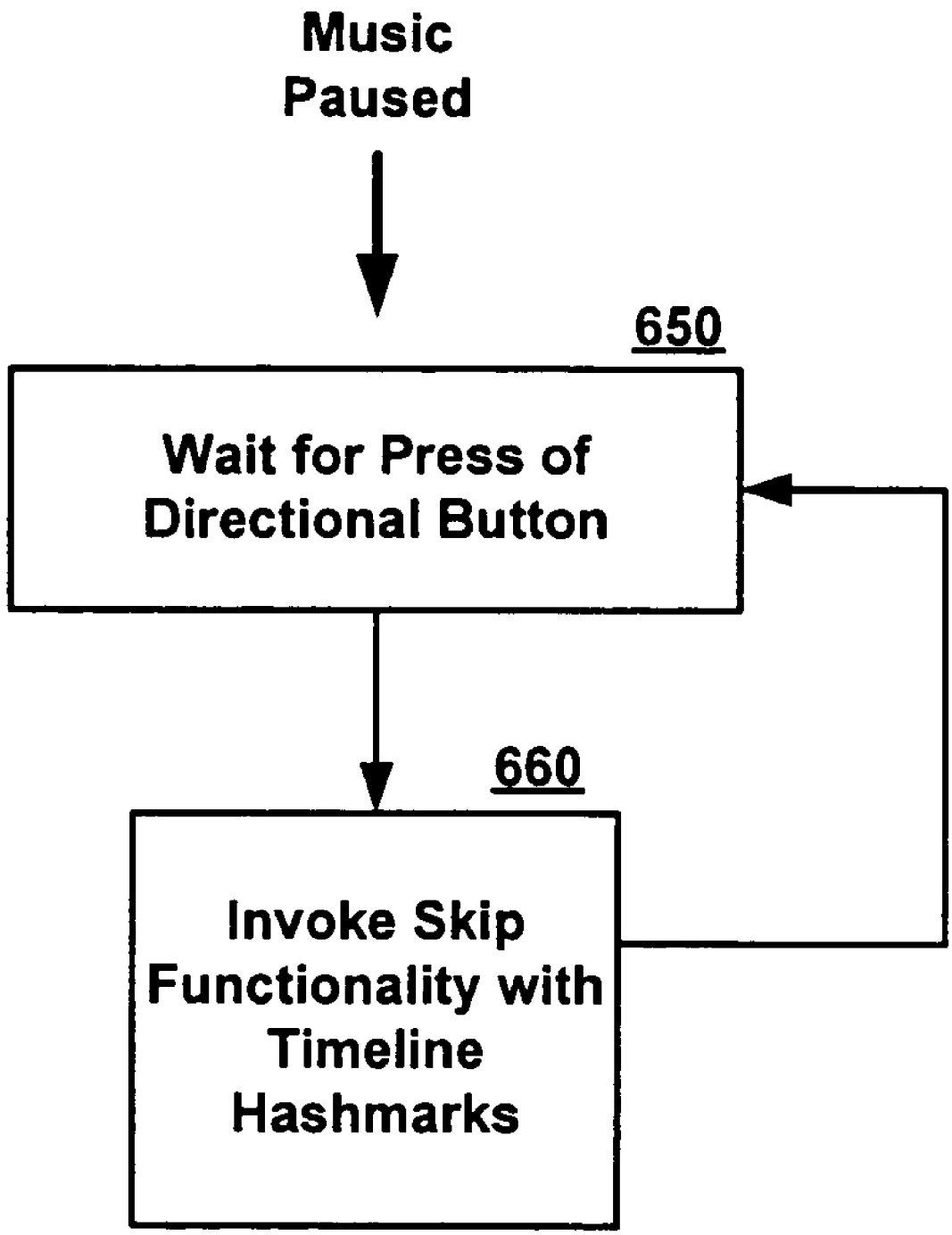

FIGS. 6A and 6B illustrate the present invention is a process that can be applied with great generality, and describe using either directional button (forward or backward) of the invention. In FIG. 6A, the media is being played, and thus at 600, the press of the directional button is waited for, and when it arrives, at 610, a determination is made whether the button is held. If not held, it is a button click, the skip functionality is carried out at 630 and the flow returns to 600. If it is held, then until the button is released at 640, whichever fast directional algorithm(s) are selected in accordance with the invention, e.g., fast accelerative algorithm, are applied. Once released, the flow returns to 600. FIG. 6B illustrates that when music is paused, either the same procedure as FIG. 6A can be followed, or a different algorithm entirely may be applied to the directional button due to the nature of media being in a paused state. Thus, when the media is paused, a wait for a button press at 650 occurs. When the button press occurs, a unique skipping algorithm for the paused scenario may be applied at 660.

There are multiple ways of implementing the present invention, e.g., an appropriate API, tool kit, driver code, operating system, control, standalone or downloadable software object, etc. which enables applications and services to use the rich playback experience enabled by the systems and methods of the invention. The invention contemplates the use of the invention from the standpoint of an API (or other software object), as well as from a software or hardware object, such as a media player, that receives data, such as a media object, in accordance with the invention. Thus, various implementations of the invention described herein may have aspects that are wholly in hardware, partly in hardware and partly in software, as well as in software. For instance, the user interface controls and corresponding interfaces to a device and its display can be implemented in hardware or software, or a combination thereof.

As mentioned above, while exemplary embodiments of the present invention have been described in connection with various computing devices and network architectures, the underlying concepts may be applied to any computing device or system in which it is desirable to temporally influence the playback or rendering of a software object. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, media player, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of rendering media, the invention is not so limited, but rather may be implemented in connection with any kind of object that is capable of being rendered on a computing device. For instance, the rendering of DVDs, TV broadcasts, word processing files, spreadsheets, movies, music, advertisements, retail products, etc. can all be processed according to the present invention. For instance, the invention may be applied to the recording and subsequent playback of the operation of a specified application, for testing or debugging purposes. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-readable storage medium comprising computer-executable modules having computer-executable instructions for implementing a user interface for a computing device having a display for use in connection with rendering a media object, comprising:
   a first input component for toggling between rendering according to a rendering speed for the media object and pausing the rendering of the media object;
   a second input component for skipping the rendering of the media object forward a predetermined amount upon a click of the second input component and for fast forwarding the rendering of the media object upon a press and hold of the second input component, wherein pre-identified key frames are displayed on the display during skipping or fast forwarding, and, if the pre-identified key frames are not available, a frame being displayed on the display at a time of activation of the second input component and a timeline that represents forward progress being made in the media being rendered are displayed, and wherein if said first input component has been toggled to a paused state, the second input component applies a different skipping algorithm in the rendering of the media object forward than if the first input component is rendering according to the rendering speed.

2. A computer-readable storage medium according to claim 1, further comprising a third input component for skipping the rendering of the media object backward a predetermined amount upon a click of the third input component and for fast reversing the rendering of the media object upon a press and hold of the third input component.

3. A computer-readable storage medium according to claim 1, wherein said skipping the rendering of the media object forward includes skipping a rendering position of the media object where the media object is currently being rendered forward a predetermined number of seconds to a new rendering position, whereby rendering resumes at said new rendering position.

4. A computer-readable storage medium according to claim 1, wherein said skipping the rendering of the media object forward includes skipping a rendering position of the media object where the media object is currently being rendered forward to the next predetermined location found in the media object, whereby rendering resumes at said predetermined location.

5. A computer-readable storage medium according to claim 1, wherein said fast forwarding includes accelerating the fast forwarding based upon how long the second input component is held.

6. A computer-readable storage medium according to claim 1, further comprising an interface for receiving and interpreting input from said first and second input components.

7. A computer-readable storage medium to claim 1, wherein said first and second input components are one of hardware and software input components.

8. A computer-readable storage medium according to claim 7, wherein said first and second input components are software input components and said input components receive input from one of a keyboard, a pointing device and a touchpad.

9. A method for directionally influencing according to a direction the rendering of a media object via a user interface of a computing device having a display, comprising:

receiving a selection of one of a playing state and a paused state via a first interface control element;

receiving input by a second interface control element, whereby if the input includes continuous input for a predetermined amount of time, said input causes fast rendering of the media object according to the direction and whereby if the input does not include continuous input, said input causes skipping of the rendering of the media object according to the direction, wherein pre-identified key frames are displayed on the display during skipping or fast rendering of the media object, and, if the pre-identified key frames are not available, a frame being displayed on the display at a time of activation of the second interface control element and a timeline that represents forward progress being made in the media being rendered are displayed, and wherein if the paused state is selected, said fast rendering of the media object and said skipping includes skipping the rendering of the media object forward according to a different algorithm than if the playing state was selected.

10. A method according to claim 9, wherein said second interface control element is one of (A) a forward button and said direction is forward and (B) a reverse button and said direction is reverse.

11. A method according to claim 9, wherein said continuous input includes receiving indication of a pressing and holding of the second interface control element and said input not including continuous input includes receiving indication of a clicking of the second interface control element.

12. A method according to claim 9, wherein if the playing state is selected, said fast rendering of the media object includes accelerating a rendering rate associated with rendering the media object and said skipping includes skipping the rendering of the media object forward a predetermined number of seconds.

13. A method according to claim 9, wherein if the playing state is selected, said fast rendering of the media object includes accelerating a rendering rate associated with rendering the media object and said skipping includes skipping the rendering of the media object forward to the next predetermined location in the media object.

14. A method according to claim 9, further comprising receiving by an interface said selection and input.

15. A method according to claim 9, wherein said first and second interface control elements are one of hardware and software input components.

16. A method according to claim 15, wherein said first and second interface control elements are software input components and said software input components receive said selection and input from one of a keyboard, a pointing device and a touchpad.

17. A computing device, comprising:

a display;

a computer readable storage medium comprising computer executable modules comprising computer executable instructions configured to interact with the display and for enabling a user to interact with the playback of a media object by a media player, a first input component for skipping the rendering of the media object forward a predetermined amount upon a click of the first input component and for fast forwarding the rendering of the media object upon a press and hold of the first input component, wherein pre-identified key frames are displayed on the display during skipping or fast forwarding, and, if the pre-identified key frames are not available, a frame being displayed on the display at a time of activation of the first input component and a timeline that represents forward progress being made in the media being rendered are displayed; and a second input component for skipping the rendering of the media object backward a predetermined amount upon a click of the second input component and for fast reversing the rendering of the media object upon a press and hold of the second input component, wherein if said media object being rendered is in a paused state, said first and second input components apply a different skipping algorithm in rendering the media object forward than if the media object being rendered is not in the paused state, wherein sound is not output if key frames are not available and the timeline is being displayed, wherein said fast forwarding includes accelerating the fast forwarding based upon how long the first input component is held, and wherein said fast reversing includes accelerating the fast reversing based upon how long the first input component is held.

18. A computing device according to claim 17, wherein said skipping the rendering of the media object forward includes skipping a rendering position of the media object where the media object is currently being rendered forward a predetermined number of seconds to a new rendering position, whereby rendering resumes at said new rendering position.

19. A computing device according to claim 17, wherein said skipping the rendering of the media object backward includes skipping a rendering position of the media object where the media object is currently being rendered backward a predetermined number of seconds to a new rendering position, whereby rendering resumes at said new rendering position.

20. A computing device according to claim 17, wherein said skipping the rendering of the media object forward includes skipping a rendering position of the media object where the media object is currently being rendered forward to the next predetermined location found in the media object, whereby rendering resumes at said predetermined location.

21. A computing device according to claim 17, wherein said skipping the rendering of the media object backward includes skipping a rendering position of the media object where the media object is currently being rendered backward to the next predetermined location found in the media object, whereby rendering resumes at said predetermined location.

22. A computing device according to claim 17, wherein said computer executable modules comprise an interface for receiving and interpreting input from said first and second input components.

23. A computing device according to claim 17, wherein said first and second input components are software input components and said input components receive input from one of a keyboard, a pointing device and a touchpad.

* * * * *